(12) United States Patent
Helinski et al.

(10) Patent No.: US 10,254,334 B2
(45) Date of Patent: Apr. 9, 2019

(54) TEST CIRCUITS FOR INTEGRATED CIRCUIT COUNTERFEIT DETECTION

(71) Applicant: National Technology & Engineering Solutions of Sandia, LLC, Albuquerque, NM (US)

(72) Inventors: Ryan Helinski, Albuquerque, NM (US); Lyndon G. Pierson, Albuquerque, NM (US); Edward I. Cole, Albuquerque, NM (US); Tan Q. Thai, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/044,007

(22) Filed: Jul. 24, 2018

(65) Prior Publication Data

US 2018/0328984 A1    Nov. 15, 2018

Related U.S. Application Data

(62) Division of application No. 14/719,535, filed on May 22, 2015, now Pat. No. 10,060,973.

(51) Int. Cl.
*G01R 31/28* (2006.01)
*G01R 31/317* (2006.01)
*H03K 19/003* (2006.01)
*H04L 9/32* (2006.01)

(52) U.S. Cl.
CPC ..... *G01R 31/2894* (2013.01); *G01R 31/2856* (2013.01); *G01R 31/31703* (2013.01); *G01R 31/31708* (2013.01); *H03K 19/003* (2013.01); *H04L 9/3247* (2013.01); *H04L 9/3255* (2013.01)

(58) Field of Classification Search
None
See application file for complete search history.

(56) References Cited

U.S. PATENT DOCUMENTS

2014/0108786 A1* 4/2014 Kreft ....................... G06F 21/71
                                                                     713/156

* cited by examiner

*Primary Examiner* — Paresh H Patel
(74) *Attorney, Agent, or Firm* — Medley, Behrens & Lewis, LLC

(57) ABSTRACT

Described herein are various technologies pertaining to identifying counterfeit integrated circuits (ICs) by way of allowing the origin of fabrication to be verified. An IC comprises a main circuit and a test circuit that is independent of the main circuit. The test circuit comprises at least one ring oscillator (RO) signal that, when energized, is configured to output a signal that is indicative of a semiconductor fabrication facility where the IC was manufactured.

10 Claims, 12 Drawing Sheets

TEST CIRCUITS FOR INTEGRATED CIRCUIT COUNTERFEIT DETECTION

RELATED APPLICATION

This application is a divisional application of, and discloses subject matter that is related to subject matters disclosed in, co-pending parent application U.S. Ser. No. 14/719,535, filed May 22, 2015 and entitled "TEST CIRCUITS FOR INTEGRATED CIRCUIT COUNTERFEIT DETECTION" which claimed benefit under 35 U.S.C. 119 (e) to U.S. Provisional Patent Application No. 62/004,743, filed on May 29, 2014, and entitled "RING OSCILLATOR CIRCUITS FOR INTEGRATED CIRCUIT COUNTERFEIT DETECTION", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Globalization of the integrated circuit (IC) manufacturing industry has led to supply chain integrity becoming a potential concern, particularly for high-consequence systems. Supply chain integrity may be compromised leading to components being counterfeited and/or subverted.

Counterfeit ICs may have been "knowingly misrepresented"; that is, they may have been marked as being fabricated at a particular fabrication facility, but in reality may have been fabricated at some other fabrication facility. For example, a customer may set forth an order for a relatively large number of ICs, and a provider may indicate to the customer that the ICs will be made at a particular fabrication facility. The provider, however, may sub-contract with a second (less expensive) provider, such that the customer is provided with ICs that perform the same function, while unbeknownst to the customer the ICs are fabricated by the second provider. There are several reasons this may be undesirable: 1) the second provider may produce ICs at lower quality than the first provider (e.g., the ICs may have a shorter lifespan); 2) the second provider may attempt to modify the design of the IC to place malicious functionality in the IC (e.g., capture credit card data and transmit it to a malicious entity); 3) the second provider may be located in a country that is embargoed by a country of the customer, thereby putting the customer at risk, etc.

As noted above, subverted ICs may have been modified for a malicious purpose during some part of the fabrication process (known as hardware Trojans) or have been wholly substituted with a "compatible" part. These modifications could be made with or without changes to the IC layout and could be used to transmit information, modify specifications of ICs (e.g., operating temperature range), or modify logical function of the IC.

Existing methods to detect counterfeit ICs include addition of special markings such as holographic stickers, transmission electron microscopy (TEM) and X-ray inspection, destructive chemical composition tests, and side-channel measurements. Holograms and other special markings are hard-to-replicate items that are attached to a product. However, holograms might not be trustworthy because they can be overbuilt, and they can be removed and re-attached. Methods of microscopic inspection are useful for finding gross differences in the geometry and composition of a part. These existing methods can be expensive, time-consuming and may generate false negatives.

SUMMARY

The following is a brief summary of subject matter that is described in greater detail herein. This summary is not intended to be limiting as to the scope of the claims.

Described herein are various technologies related to determining whether an integrated circuit (IC) has been fabricated at a particular semiconductor fabrication facility. Thus, described herein are various technologies related to determining whether an IC is counterfeit, subverted, etc. To that end, an IC comprises a main circuit (which performs an operation for which the IC is designed) and a test circuit, which is co-formed with the main circuit and integrated independent of the main circuit in the IC. In an example, the test circuit comprises a ring oscillator circuit. In another example, the test circuit comprises a plurality of ring oscillator circuits and a switching circuit, such that each ring oscillator circuit can be independently energized by way of the switching circuit. Thus, fabrication characteristics of the main circuit will also be present in the test circuit.

A standard IC (or multiple standard ICs) is known to have been fabricated at the particular semiconductor fabrication facility, and can be used as a standard for ascertaining whether other ICs have been fabricated at the particular semiconductor fabrication facility. Each standard IC comprises the main circuit and the test circuit. The test circuit of the standard IC is energized with a DC voltage from a voltage source, which causes the test circuit to emit at least one output signal. A standard signature is then formed based upon the output signal. For instance, the standard signature may be a time-series signal, obtained by sampling the at least one output signal at a suitable sampling rate. In another example, the standard signature can be generated by analyzing the at least one output signal to identify features of the at least one output signal, and such features can be included in the standard signature. Exemplary features include, but are not limited to, frequencies existent in the at least one output signal, distribution of frequencies in the at least one output signal, median frequency in the at least one output signal, etc.

To ascertain whether an IC (test IC) is fabricated at the same semiconductor fabrication facility as the standard IC, the test circuit of the test IC is energized with the same DC voltage from the voltage source as was used to energize the test circuit of the standard IC, resulting in the test circuit of the test IC emitting an output signal. Similar to what has been described above, a test signature can be generated based upon the output signal from the test circuit of the test IC. When the standard IC and the test IC have been manufactured at the same semiconductor fabrication facility, the standard signature and the test signature will be highly similar. When, however, the standard IC and the test IC have been manufactured at different semiconductor fabrication facilities, the test signature will be somewhat different from the standard signature. Accordingly, to ascertain whether the test IC was manufactured at the approved semiconductor fabrication facility, the test signature is compared with the standard signature (using any suitable comparison technique). If the test signature is found to be sufficiently similar to the standard signature, then the IC can be labeled as being fabricated at the same semiconductor fabrication facility as the standard IC. If the test signature is found to be sufficiently dissimilar to the standard signal, then the test IC can be labeled as potentially being fabricated at a different semiconductor fabrication facility than the one used to manufacture the standard IC.

As noted above, the test circuit of each IC can comprise several ring oscillator (RO) circuits and a switch circuit, such that each RO circuit of the test circuit can be independently energized. Each RO circuit in the test circuit can have different characteristics—for example, a first RO circuit can comprise metallic traces of a first (relatively large) width, while a second RO circuit can comprise metallic traces of a second (relatively narrow) width. In another example, a third RO circuit can comprise metallic traces formed of a first material, while a fourth RO circuit can comprise metallic traces formed of a second material. Each of these different characteristics, or "flavors", of the RO circuits corresponds to a respective (distinct) aspect of the IC manufacturing process. Each RO circuit can be independently energized, such that each RO circuit emits an output signal. When the IC is a standard IC, the output signals (or representations thereof) can be used to generate the standard signature, while when the IC is one to be tested, the output signals (or representations thereof) can be used to form the test signature.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
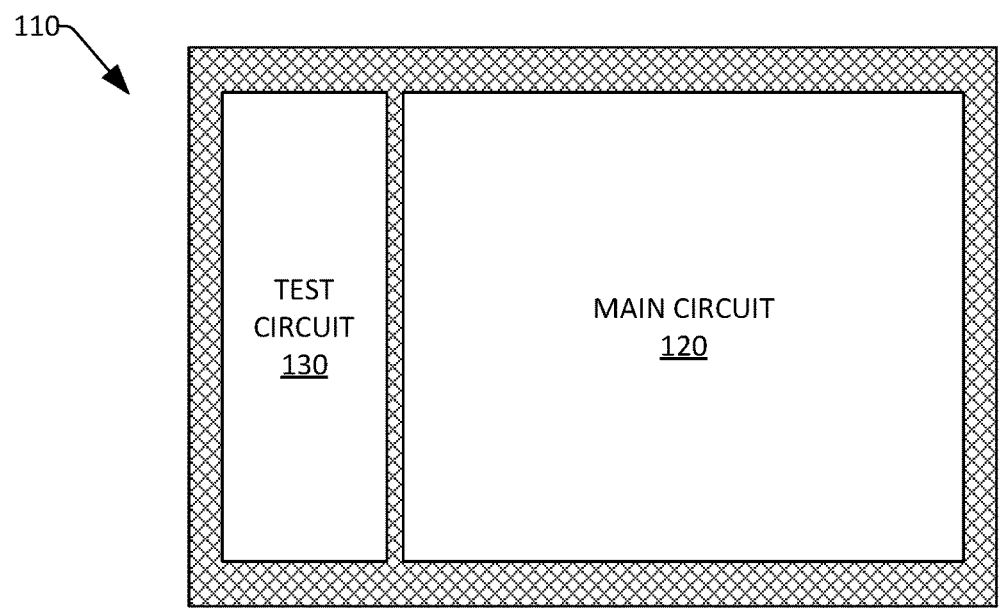
FIG. 1 is a schematic illustrating an exemplary integrated circuit (IC) that comprises a test circuit that is configured to emit a signal that is indicative of a semiconductor fabrication facility where the IC was manufactured.

Various technologies are presented herein pertaining to utilizing a test circuit to determine whether an integrated circuit (IC) is fabricated at a particular semiconductor fabrication facility (and is thus potentially counterfeit), wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As used herein, the terms "component", "device", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component", "device", and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

With reference now to FIG. 1, an exemplary integrated circuit (IC) 110 is illustrated, wherein the IC is particularly well-suited for counterfeit IC detection (e.g., determining whether an IC is fabricated at a particular manufacturing facility). The IC 110 comprises a main circuit 120, which is configured to perform any suitable operation. Functionality of the main circuit 120 can be defined by a customer of a manufacturer, and can be fabricated by the manufacturer to meet the specifications set forth by the customer. The IC 110 also comprises a test circuit 130 that is integrated with the main circuit 120 in the IC but is independent of the main circuit 120 in the IC 110. That is, the test circuit 130 does not impact operation of the main circuit 120, and can be electrically separated from the main circuit 120. In an example, and as will be described in greater detail below, the test circuit 130 can comprise a ring oscillator (RO) circuit. In another example, the test circuit 130 can comprise a plurality of RO circuits and a switching circuit, such that each of the RO circuits can be independently energized by way of an energy source and the switching circuit. In yet another example, the test circuit 130 can comprise an arrangement or resistors. Still further, the test circuit 130 can comprise an arrangement of capacitors. In another example, the test circuit 130 can comprise an arrangement of inductors. In still yet another example, the test circuit 130 can comprise some combination of resistors, capacitors, and/or inductors. Still further, the switching circuit can facilitate energizing two or more circuits in parallel. When the test circuit 130 comprises multiple RO circuits, each RO circuit in the test circuit 130 can have characteristics that are unique to the RO circuit. For example, a first RO circuit can comprise metallic traces with a first width, while a second RO circuit can comprise metallic traces with a second width. In another example, a third RO circuit can comprise metallic traces formed of a first composition, while a fourth RO circuit can comprise metallic traces formed of a second composition. Exemplary RO circuits having unique characteristics are described in greater detail below.

The test circuit 130 can be a relatively small size in comparison to the main circuit 120. In an embodiment, the test circuit 130 can occupy 1-4% of the total available area of the IC 110. Depending on the main circuit size, this fraction could be smaller.

A first scenario where the IC 110 is employed as a standard (i.e., baseline) IC is now set forth. In such a scenario, the customer has knowledge that the IC 110 was manufactured at a particular semiconductor fabrication facility. For instance, the customer can provide the design of the IC 110 to a provider, and the provider can return the IC 110 as a portion of an initial batch. An energy source (not shown) can be placed in electrical communication with the test circuit 130, such that at least a portion of the test circuit 130 (e.g., one of the several RO circuits) is energized (e.g., by way of the switching circuit). Responsive to being energized, the test circuit emits an output signal. In an example, the output signal can be sampled at a suitable sampling rate to generate a time-series signal, and the time-series signal can be saved in computer-readable memory as at least a portion of a standard signature (e.g., a signature for the standard IC and, thus, a signature for the semiconductor fabrication facility where the standard IC was manufactured). In another example, the output signal can be analyzed, and values of features of the output signal can be used to generate the standard signature. Exemplary features of the output signal include, but are not limited to, frequencies observed in the output signal, magnitude of the output signal, and the like. Standard signatures can be generated, for instance, based upon output signals from each RO circuit in the test circuit 130 (as well as for combinations of RO circuits in the test circuit 130).

In a second scenario, the IC 110 can be presented as being manufactured at the same semiconductor fabrication facility as the standard IC, and the customer may wish to verify that the IC 110 has been manufactured at such facility (and is thus not a counterfeit IC that may be subject to subversion). As with the standard IC, the test circuit 130 of the IC 110 is electrically connected to an energy source, and the switching circuit is operated to cause portions (e.g., RO circuits) of the test circuit 130 to be energized. Responsive to being energized, for instance, the RO circuits emit respective output signals, and a test signature can be generated based upon the output signals. As with the standard signature, the test signature is representative of the semiconductor fabrication facility where the IC 110 was manufactured. For example, the test signature can comprise values of frequencies observed in the output signals, distributions of frequencies observed in the output signals, etc. The test signature can then be compared with the standard signature (e.g., using any suitable comparison technique). If the test signature is found to be sufficiently similar to the standard signature, then the IC 110 can be labeled as being manufactured at the same semiconductor fabrication facility as the standard IC. If, however, the test signature is found to be sufficiently dissimilar to the standard signature, then the IC 110 can be labeled as being potentially manufactured at a different semiconductor fabrication facility as the standard IC, and thus as a potential counterfeit IC.

Figure 2:
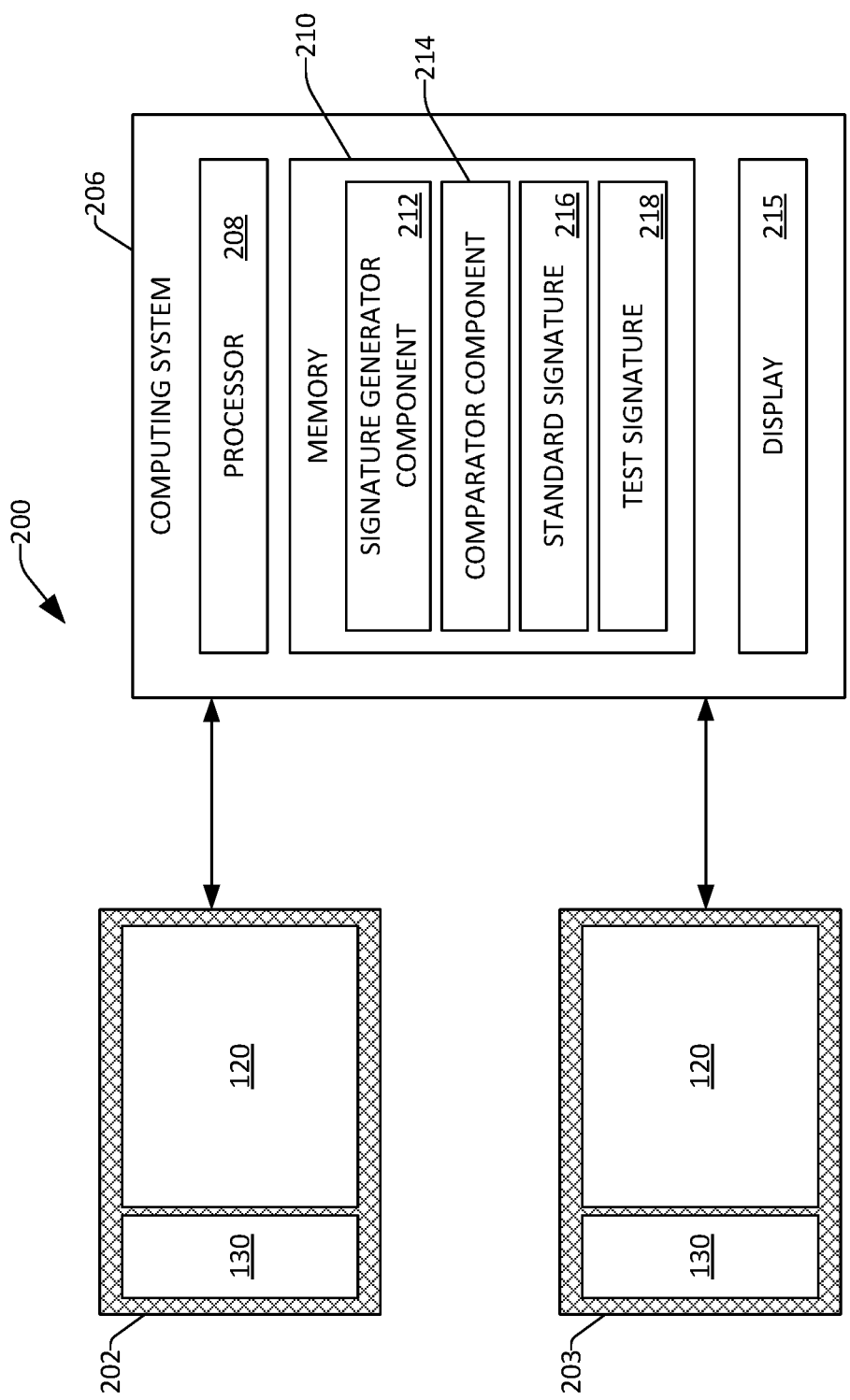
FIG. 2 is a schematic illustrating an exemplary system that facilitates determining whether an IC was fabricated at a particular semiconductor fabrication facility.

FIG. 2 illustrates an exemplary system 200 that can be utilized to determine whether an IC has been manufactured at a particular semiconductor fabrication facility. The system 200 comprises a first IC 202 that comprises the main circuit 120 and the test circuit 130. The system 200 additionally comprises a second IC 203 that comprises the main circuit 120 and the test circuit 130. The first IC 202 is known to have been manufactured at a trusted semiconductor fabrication facility, while the second IC 203 has been presented as being manufactured at the trusted semiconductor fabrication facility, and it is desired to confirm that the second IC 203 has been manufactured at the trusted facility (rather than some other facility). The first IC 202 may be referred to herein as a standard IC 202, while the second IC 203 may be referred to herein as a test IC.

The system 200 further comprises a computing system 206 that is electrically connectable to the test circuit 130 of either the standard IC 202 or the test IC 203, where, as will be described in greater detail herein, the computing system 206 can act as an energy source that delivers energy to the test circuit 130. When the test circuit 130 comprises multiple sub-circuits (RO circuits), the computing system 206 controls the switching circuit of the test circuit 130 such that an appropriate sub-circuit or combination of sub-circuits is energized by the computing system 206.

The computing system 206 comprises a processor 208 and memory 210, wherein the memory 210 comprises data that is accessible to the processor 208 and instructions that are executed by the processor 208. With more particularity, the memory 210 comprises a signature generator component 212 that is configured to generate signature(s) based upon signal(s) emitted from the test circuit 130 of either the standard IC 202 or the test IC 203 (e.g., when RO circuits of the test circuit 130 are energized by the computing system 206). The memory 210 further comprises a comparator component 214 that is configured to compare signatures with one another and output an indication as to whether the signatures are similar to one another or dissimilar to one another. The computing system 206 further comprises a display 215 that is in communication with the processor 208, wherein the display 215 can display data indicative of whether or not the signatures compared by the comparator component 214 are similar to one another or dissimilar to one another.

Operation of the system 200 is now set forth. In a first scenario, the system 200 is employed to generate a standard signature using the standard IC 202, which, as noted above, is known to have been manufactured at a certain semiconductor fabrication facility. The generated signature can thus act as a signature for the semiconductor fabrication facility itself. In connection with generating the standard signature, the signature generator component 212 is configured to energize the test circuit 130 of the standard IC 202 by transmitting energy to the test circuit 130. As indicated above, the test circuit 130 may comprise a switching circuit (not shown) and a plurality of RO circuits that can be electrically coupled to the computing system 206 by way of the switching circuit. The signature generator component 212 can cause the computing system 206 to emit control signals to the test circuit, thereby controlling the switching circuit such that a particular RO circuit in the test circuit 130 is electrically connected to the computing system 206. Thereafter, the signature generator component 212 can cause the computing system 206 to emit an energy signal (voltage), thereby energizing the aforementioned RO circuit and causing the RO circuit to emit an output signal.

The computing system 206 receives the output signal emitted by the RO circuit of the test circuit 130 (responsive to the RO circuit being energized). The signature generator component 212 generates a standard signature 216 based upon the output signal(s) from the test circuit of the standard IC 202, and causes the standard signature 216 to be retained in the memory 210 (or other suitable computer-readable storage) of the computing system 206. In an example, the signature generator component 212 can sample the output signal at a suitable sampling rate to form a time-series signal, and at least a portion of the time-series signal can be retained as at least a portion of the standard signature 216 in the memory 210. In another example, the signature generator component 212 can analyze the output signal and identify features thereof, such as frequencies observed in the output signal, peak magnitude observed in the output signal, etc. The signature generator component 212 can then save these characteristics in a feature vector as at least a portion of the standard signature 216 in the memory 210. This process can be repeated for each RO circuit in the test circuit 130 of the standard IC 202 and/or each desired combination of RO circuits in the test circuit 130 of the standard IC 202. Thus, the standard signature 212 can represent output of each RO circuit (and/or combination of RO circuits) in the test circuit 130 of the standard IC 202 when such RO circuits are energized by the computing system 206. As will be described in greater detail below, each RO circuit in the test circuit 130 will have characteristics that are unique to the RO circuit, and further have characteristics that are indicative of where the RO circuit was manufactured (e.g., characteristics that would be difficult to replicate at a different semiconductor fabrication facility). Thus, the standard signature 216 acts as a signature for the semiconductor fabrication facility where the standard IC 202 was manufactured.

In a second scenario, the system 200 is employed to output an indication as to whether the test IC 203 has been fabricated at the same semiconductor fabrication facility as where the standard IC 202 was fabricated. The computing system 206 is electrically coupled to the test circuit 130 of the test IC 203 (e.g., in the same way that the standard test circuit 130 of the standard IC 202 was coupled to the computing system 206 when generating the standard signature). The signature generator component 212 controls the switching circuit of the test circuit 130 such that a particular RO circuit in the test circuit 130 is electrically coupled to the computing system 206. Subsequently, the signature generator component 212 causes the computing system 206 to energize the RO circuit of the test IC 203, which in turn causes the RO circuit to emit an output signal.

The computing system receives the output signal emitted by the RO circuit of the test circuit 130 (responsive to the RO circuit being energized) on the test IC 203. The signature generator component 212 generates a test signature 218 based upon the output signal, and causes the test signature 218 to be retained in the memory 210 of the computing system 206. As noted previously, the signature generator component 212 can sample the output signal at a suitable sampling rate to form a time-series signal, and at least a portion of the time-series signal can be retained as at least a portion of the test signature 218 in the memory 210. In another example, the signature generator component 212 can analyze the output signal and identify values of features thereof, such as frequencies, peak magnitude, etc. The signature generator component 212 can then save these values in a feature vector as at least a portion of the test signature 218 in the memory 210. This process can be repeated for each RO circuit in the test circuit 130 of the test IC 203 and/or each desired combination of RO circuits in the test circuit 130 of the test IC 203, so long as it is consistent with the technique used to form the standard signature 216. Thus, the test signature 218 can represent output of each RO circuit (and/or combination of RO circuits) in the test circuit 130 of the test IC 203 when such RO circuits are energized by the computing system 206, which is in turn indicative of the semiconductor fabrication facility used to manufacture the test IC 203.

The comparator component 214 can then compare the test signature 218 with the standard signature 216. Since the test circuits 130 of both the standard IC 202 and the test IC 203 are presumably very similar (as they were presumably manufactured at the same semiconductor fabrication facility using the same design), the test signature 218 should be very similar to the standard signature 216. The comparator component 214 can utilize any suitable technique when comparing the test signature 218 with the standard signature 216. For instance, the comparator component 214 can compute a value for a distance measure that is indicative of a distance between the test signature 218 and the standard signature 216. If the value is above a threshold, then the comparator component 214 can assign a label to the test signature 218 (and thus the test IC 203 corresponding to the test signature 218) that indicates that the standard IC 202 and the test IC 203 were potentially manufactured at different semiconductor fabrication facilities. Contrarily, if the value is at or below the threshold, then the comparator component 214 can assign a label to the test signature 218 (and thus the test IC 203) that indicates that the standard IC 202 and the test IC 203 were manufactured at the same semiconductor fabrication facility. The comparator component 214 can subsequently cause graphical data to be presented on the display 215, wherein the graphical data is indicative of the label. The signature generator component 212 can update the standard signature 216 based upon the test signature 218 once the test signature has been found to be sufficiently similar to the standard signature 216—since such similarity indicates that the test IC 203 was manufactured at the same semiconductor fabrication facility as the standard IC 202. It is to be noted that while the standard signature 216 has been referenced as being based upon output signals from a single test circuit 130 of a single baseline IC, in practice the standard signature 216 can be based upon several output signals from several test circuits of several baseline ICs. For instance, the standard signature 216 can include distribution data that indicates distribution of frequency values corresponding to certain sub-circuits of the test circuits 130 of the baseline ICs.

With more detail pertaining to the signature generator component 212, such component 212 can operate in conjunction with a local clock (not shown) at a known clock speed. The clock can be a crystal oscillator which oscillates at a particular frequency, e.g., about 50 MHz. The signature generator component 212 can compute the frequency of signals output from the test circuit 130 using the local clock. As noted above, these frequencies can be or be included in the standard signature 116 and/or the test signature 118.

Further, as noted previously, the test circuit 130 (of both the standard IC 202 and the test IC 203) can include several integrated RO circuits. RO circuits are a class of logic circuits which can include a feedback loop that makes them unstable. RO circuits can have an odd number of inverting stages, usually NOT gates (inverters), connected in a loop. One of the NOT gates is typically replaced with an inverting NAND gate to allow the RO to be shut off. When enabled, the output of an RO oscillates rapidly between logic '1' and '0'. The speed of oscillation depends on the performance characteristics of each gate in the chain, and is referred to as the "free-running frequency". In practice, the free-running frequency of real RO circuits is a random variable and can be modeled by a normal distribution. The foregoing can apply to both RO circuits on a single IC, and RO circuits operating across a plurality of ICs.

RO frequencies can be combined in various ways in order to produce random bits. This can be useful for implementing physical unclonable functions (PUFs), which are circuits with a challenge input and a response output. The challenge can be thought of as an address into a table of static random output words. A PUF's output is ideally random and follows a uniform distribution, e.g., each output bit should be like a fair coin toss that is decided at the time of manufacturing. Instead of combining RO frequencies in this manner, a measurement of each RO frequency can be determined (e.g., by the signature generator component 212). Accordingly, given a plurality of standard ICs, a distribution of RO frequencies including the mean and variation can be determined. In the scenario where a counterfeiter intends to match the parameters of genuine parts exactly, it may be harder to match the exact distribution of a parameter than it is to match the mean of the parameter.

However, knowing the distribution of ordinary RO frequencies on a chip may not be enough to detect counterfeit ICs. For example, the level of variation in this RO frequency distribution between ICs might be on the same order of magnitude as the level of variation between two manufacturers. If such a condition was true, then two ICs from a single manufacturer would look no different from two ICs made at different manufacturers (e.g., in different countries). To address this, and as further described below, the various embodiments presented herein utilize various distinct implementations of the same process characterization circuit (the RO circuits discussed above) that are designed to amplify distinct aspects of the hardware. First, the test circuit 130 can include a "nominal" RO, which is designed such that it is scaled up by a particular factor. In an embodiment, the scaling factor can have a magnitude of two. Critical dimensions of circuit designs are sometimes scaled up to reduce variations and to enhance yield. Scaling up a design includes increasing certain dimensions and increasing the number of silicon contacts (CCs) and inter-metal-layer vias, and results in a circuit that has decreased performance, but is less variable. Subsequently, different "flavors" of the nominal RO circuit are designed and added to amplify small variations in specific hardware features. The approach of adding "flavors" can be performed by changing a size or changing a material of a feature in comparison with the nominal RO circuit. For example, by sizing down one or more specific hardware features, different flavor RO circuits can be formed such that a degree of variation in RO circuit structure and according operation can be achieved. In another embodiment, one or more features can be sized up from the nominal RO circuit. For example, one flavor of RO circuit can utilize minimum-size transistors, while another can utilize minimum-size metal-1 (the first and lowest layer) interconnects.

Figure 3:
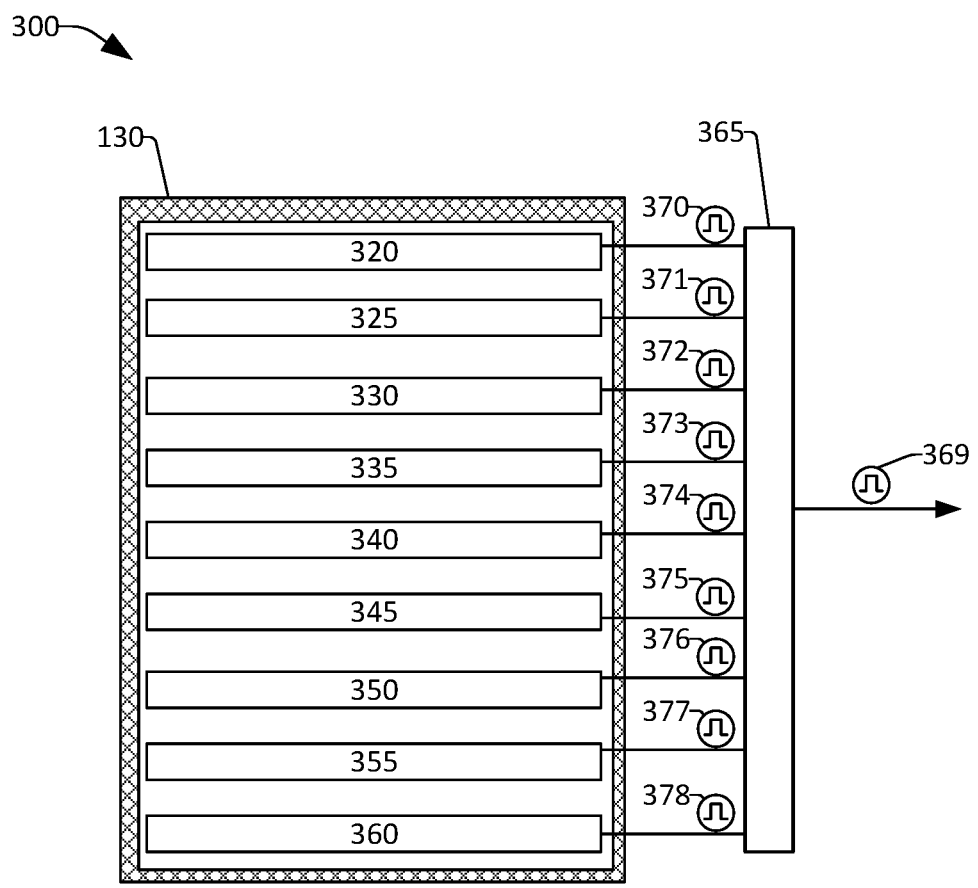
FIG. 3 is a schematic illustrating an exemplary test circuit of an IC.

To facilitate further understanding of the concept of flavors of RO circuit, FIGS. 4-9 illustrate 6 different RO circuits (and thus 6 different "flavors"). As illustrated in FIG. 3, each of the ROs can be enabled individually, and multiplexed onto a common "oscillator output" pin. The RO frequency can be measured off-chip, or this function could be integrated into the design of the IC 110. As described above, this prototype design can be integrated into an IC design with low overhead.

FIG. 3 is a schematic 300 of a layered test circuit (e.g., the test circuit 130), wherein different layers of the test circuit have different flavors that can be switched in and out to enable formation of a plurality of signatures. The test circuit 130 comprises a plurality of sub-circuits 320-360. It is to be understood that the test circuit 130 can include more or fewer sub-circuits than the sub-circuits 320-360 described herein. Each of the sub-circuits 320-360 has an attribute that differentiates such sub-circuit from other sub-circuits in the test circuit 130. For example, the first sub-circuit 320 can include a first trace having a first dimension (e.g., a first width) while the second sub-circuit 325 can include a second trace having a similar configuration (e.g., serpentine) as the first trace but having a second dimension (e.g., a second width). The test circuit 130 can include or be connected to a switching circuit 365, which facilitates electrically coupling any of the sub-circuits 320-360 to the signature generator component 212. For instance, the switching circuit 365 can be a multiplexor switch. The signature generator component 212 can be configured to control switching of the switching circuit 365 to enable output signals from the various sub-circuits 320-360 to be obtained.

As further described in conjunction with FIGS. 4-9, the signature generator component 212 can cause the computing system 206 to direct voltage to a desired one of the sub-circuits 320-360. The signature generator component 212 can then receive an output signal 369, which is one of the respective output signals 370-378 emitted from the sub-circuits 320-360. When the test circuit 130 is a portion of the standard IC 202, the signature generator component 212 can generate the standard signature 216 based upon signals 370-378. When the test circuit 130 is a portion of the test IC 203, the signature generator component 212 can generate the test signature 218 based upon the signals 370-378. The comparator component 214 can then compare all or portions of the test signature 218 with all or respective portions of the standard signature 216.

Figure 4:
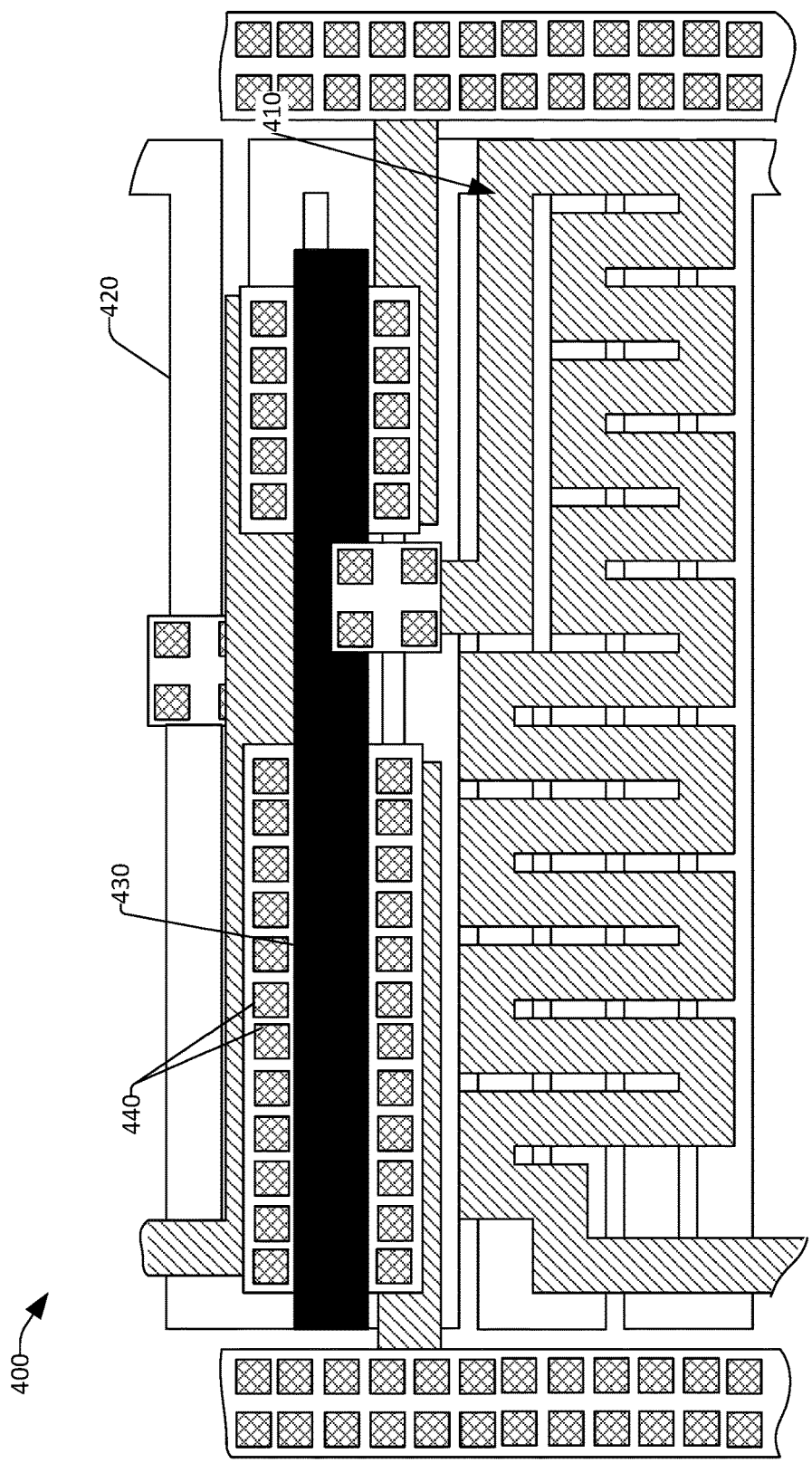
FIG. 4-9 are schematics of exemplary ring oscillator (RO) circuits.

With reference now to FIG. 4, an exemplary RO circuit 400 is illustrated, where the RO circuit 400 is one of the sub-circuits 320-360 depicted in FIG. 3. The RO circuit 400 comprises a plurality of features including a first trace 410, a second trace 420, a first transistor 430, and a first number of contacts 440. In an example, as previously mentioned, various features in the RO circuit 400 can be increased in size (e.g., by a factor of 2) than would typically be used for such a RO circuit 400 to enable factors that have to be considered when fabricating features with smaller sizes to be eliminated.

Figure 5:
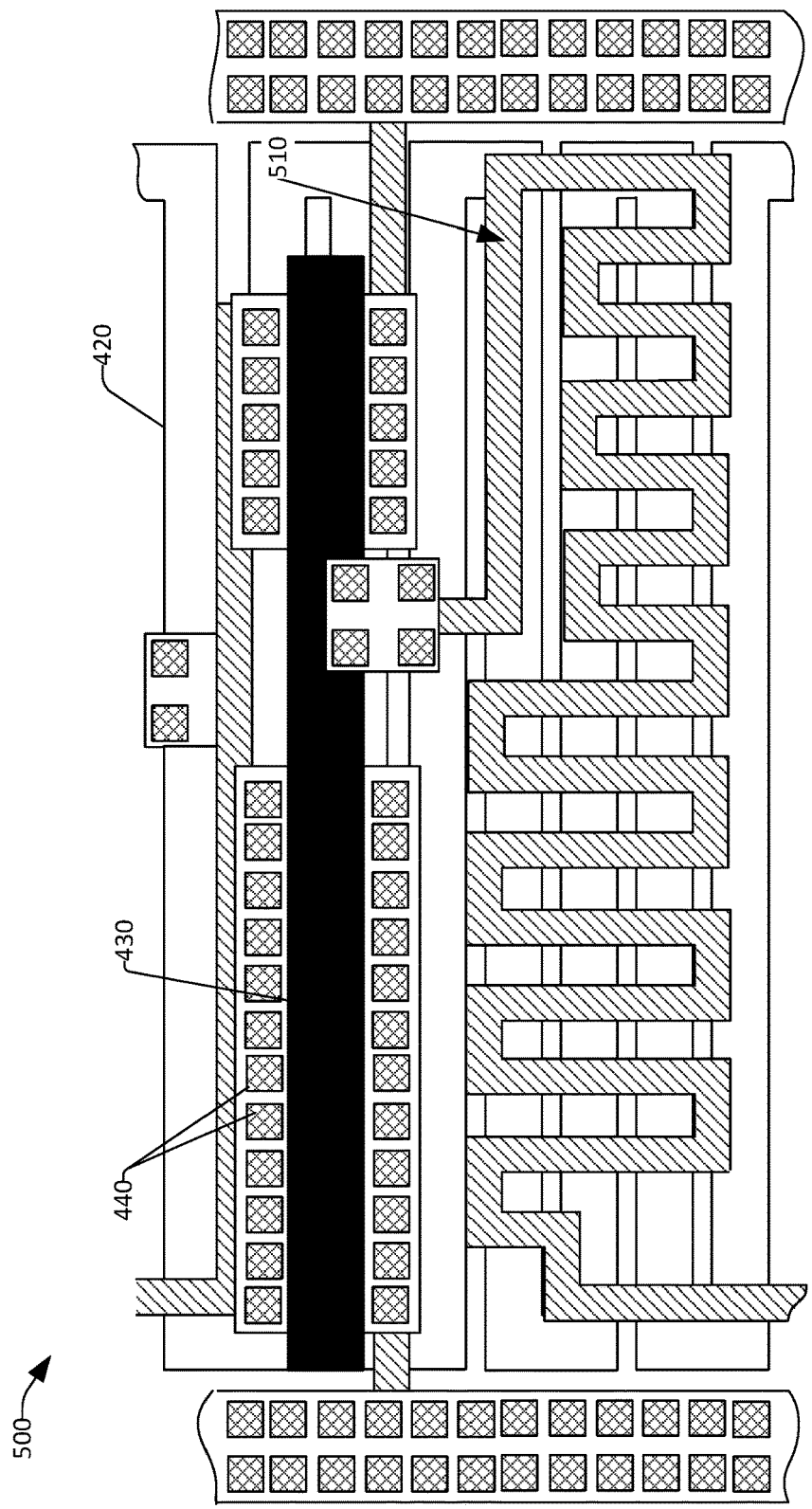

Turning to FIG. 5, another exemplary RO circuit 500 is illustrated, wherein the RO circuit 500 is one of the sub-circuits 320-360 depicted in FIG. 3. The RO circuit 500 comprises several features of the RO circuit 400. However, the first trace 410 of RO circuit 400 is replaced with a third trace 510 in the circuit 500, wherein the third trace 510 is narrower than the first trace 410. Hence, by utilizing the various features presented in the RO circuit 500, an assessment of the effect of trace dimensioning on a signal output by the test circuit 130 can be made.

Figure 6:
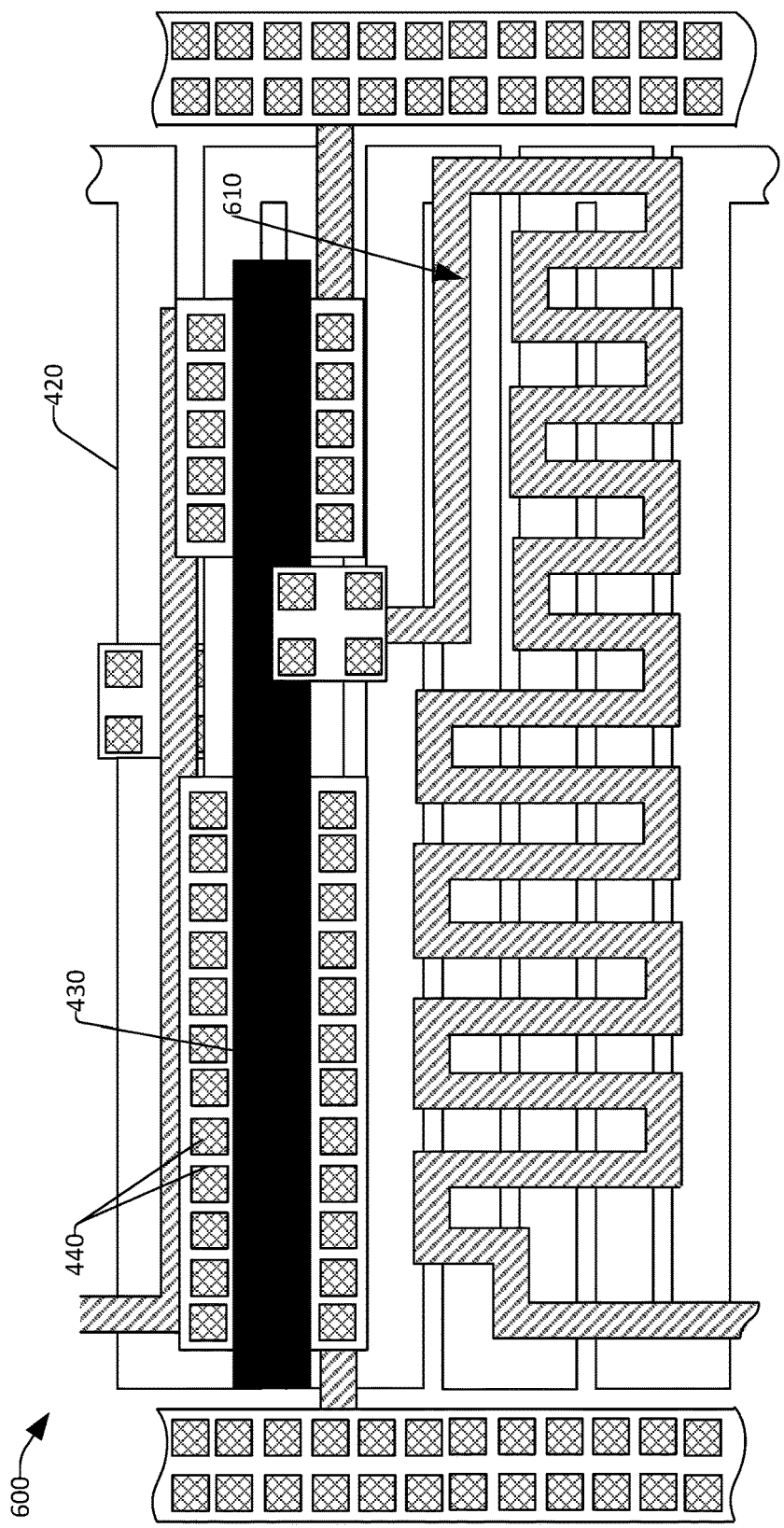

With reference to FIG. 6, another exemplary RO circuit 600 is illustrated, wherein the RO circuit 600 is one of the sub-circuits 320-360 depicted in FIG. 3. The RO circuit 600 comprises several features found in the RO circuit 400. However, the first trace 410 of the RO circuit 400 is replaced with a fourth trace 610 in the RO circuit 600, wherein the fourth trace 610 is narrower than the first trace 410, and further is formed from a different material (e.g., different composition) than the material of the first trace 410. Hence, by utilizing the various features presented in the RO circuit 600, an assessment of the effect of material composition and feature size on a signal output from the test circuit 130 can be made.

Figure 7:
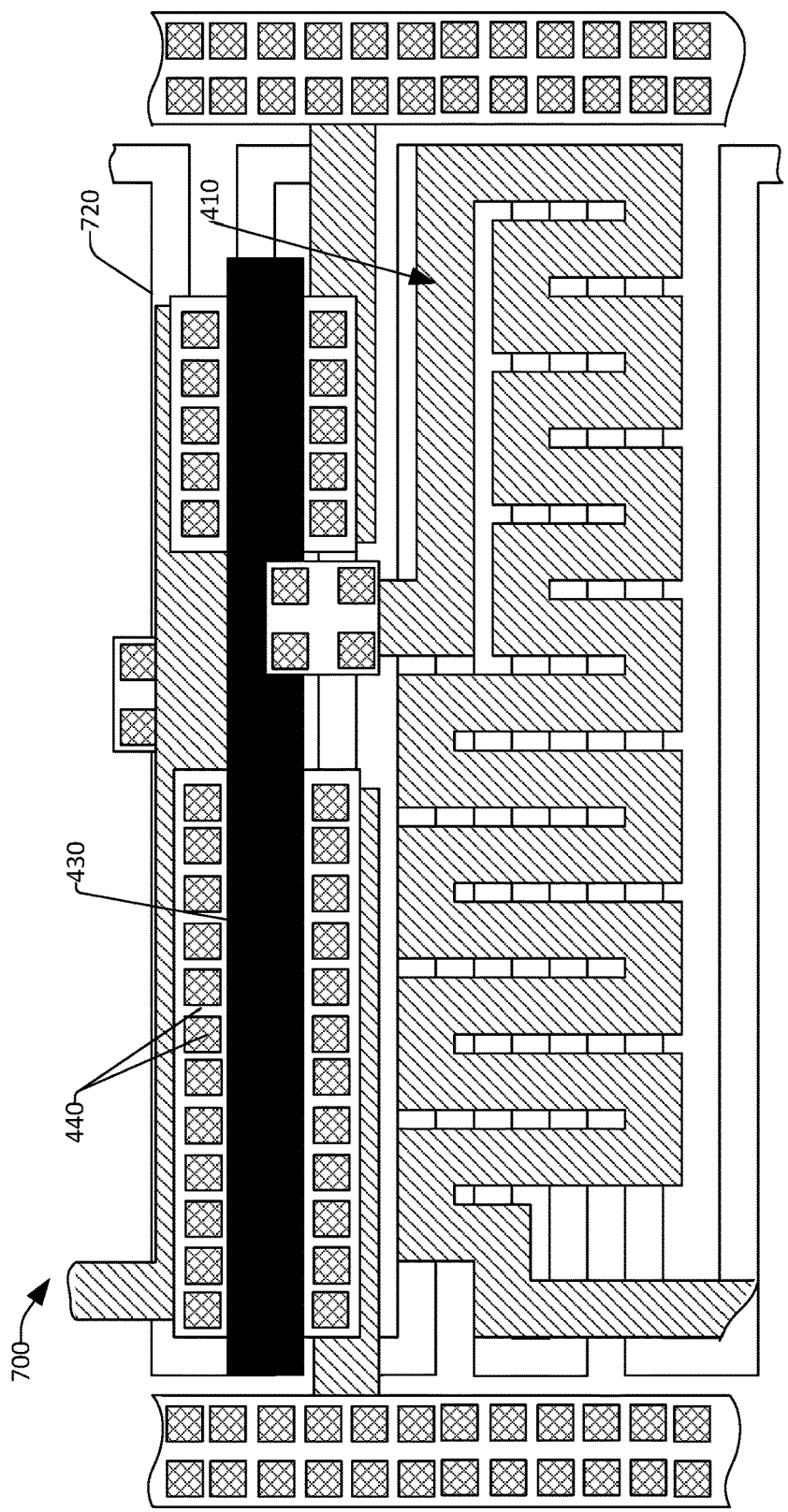

Turning to FIG. 7, yet another exemplary RO circuit 700 is illustrated, wherein the RO circuit 700 is one of the sub-circuits 320-360 depicted in FIG. 3. The RO circuit 700 comprises several features found in the RO circuit 400. However, the second trace 420 of the RO circuit 400 is replaced with a fifth trace 720 in the RO circuit 700, wherein the fifth trace 720 is narrower than the second trace 420. Hence, by utilizing the various features presented in the RO circuit 700, an assessment of the effect of feature dimensioning in a distinct layer on a signal output by the test circuit 130 can be made.

Figure 8:
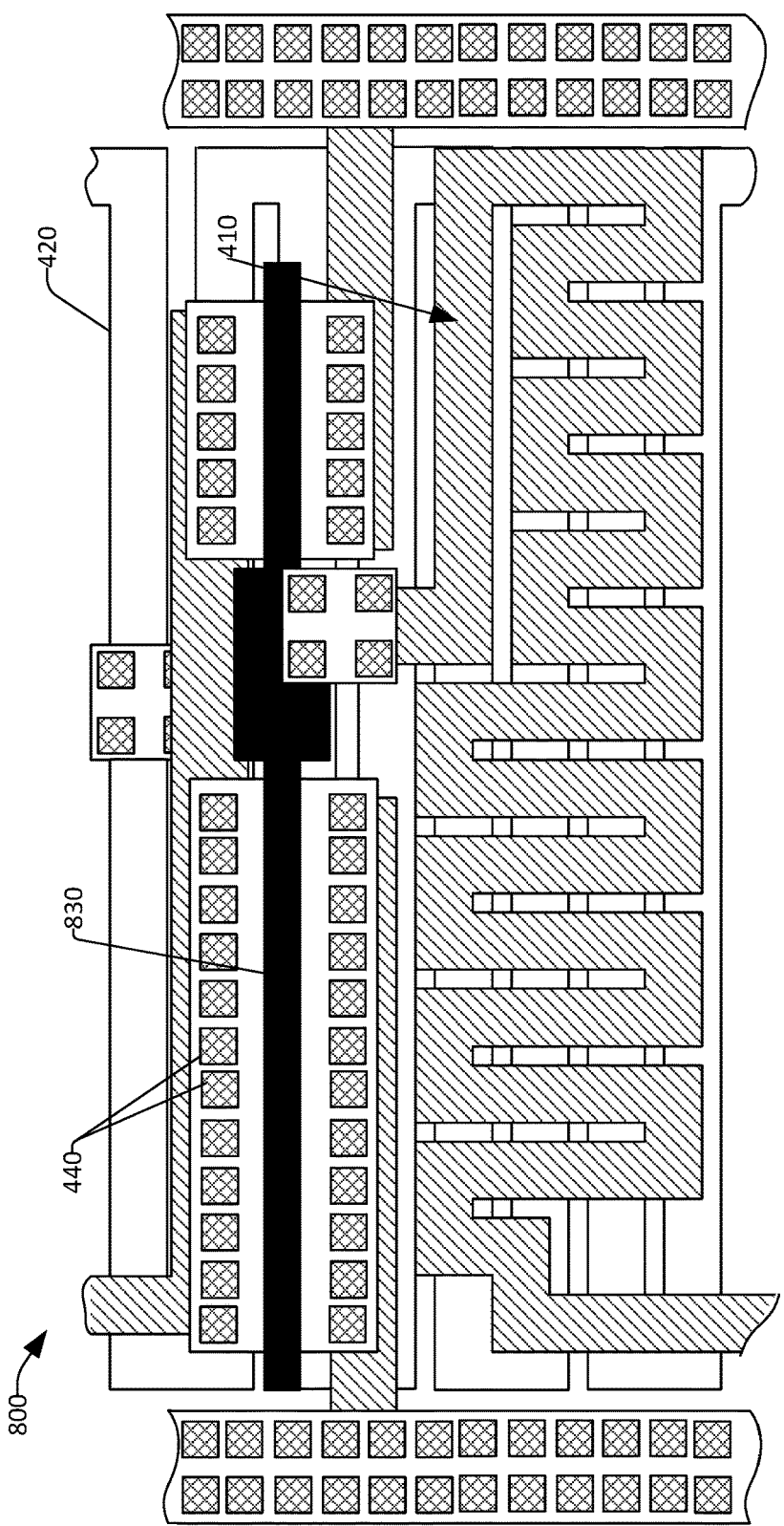

Now referring to FIG. 8, still yet another exemplary RO circuit 800 is illustrated, wherein the RO circuit 800 is one of the sub-circuits 320-360 depicted in FIG. 3. The RO circuit 800 comprises several features found in the RO circuit 400. However, the RO circuit 800 comprises transistors 830 that are smaller in dimension than the transistors 430 in the RO circuit 400. Hence, by utilizing the various features presented in the RO circuit 800, an assessment of the effect of transistor size on a signal output by the test circuit 130 can be made.

While not shown, it is to be understood that the test circuit 130 can include multiple RO circuits of the same design. That is, an RO circuit can be repeated in the test circuit, which allows for additional statistical data to be acquired, wherein such additional data can be useful in ascertaining whether an IC was manufactured at a particular fabrication facility, is part of a particular lot, etc.

Figure 9:
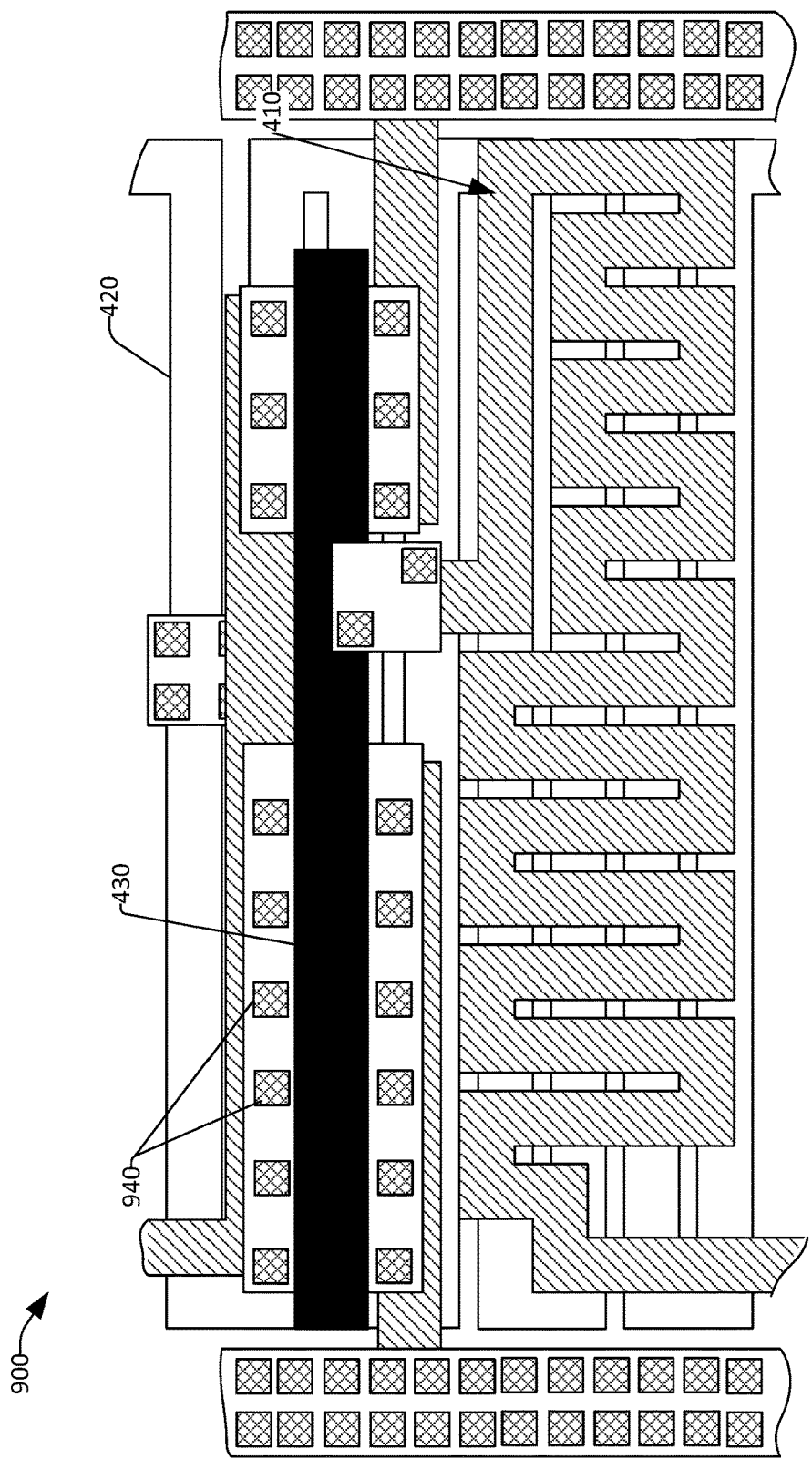

Turning to FIG. 9, another exemplary RO circuit 900 is illustrated, wherein the RO circuit 900 is included in the sub-circuits 320-360 illustrated in FIG. 3. The RO circuit 900 comprises several features included in the RO circuit 400. However, the RO circuit 900 comprises contacts 940, where a number of contacts in the contacts 940 is less than the number of contacts in the contacts 440 of the RO circuit 400. Hence, by utilizing the various features presented in the RO circuit 900, an assessment of the effect of number of contacts in a circuit on a signal output by the test circuit 130 can be made.

In an exemplary stacking, the RO circuits 400-900 can be stacked in the order presented herein, with the RO circuit 400 placed on top of the stack and the RO circuit 900 placed on the bottom of the stack. In another example, the RO circuits 400-900 can be placed side-by-side. Further, the test circuit 130 can include more or fewer RO circuits than those presented here.

Figure 10:
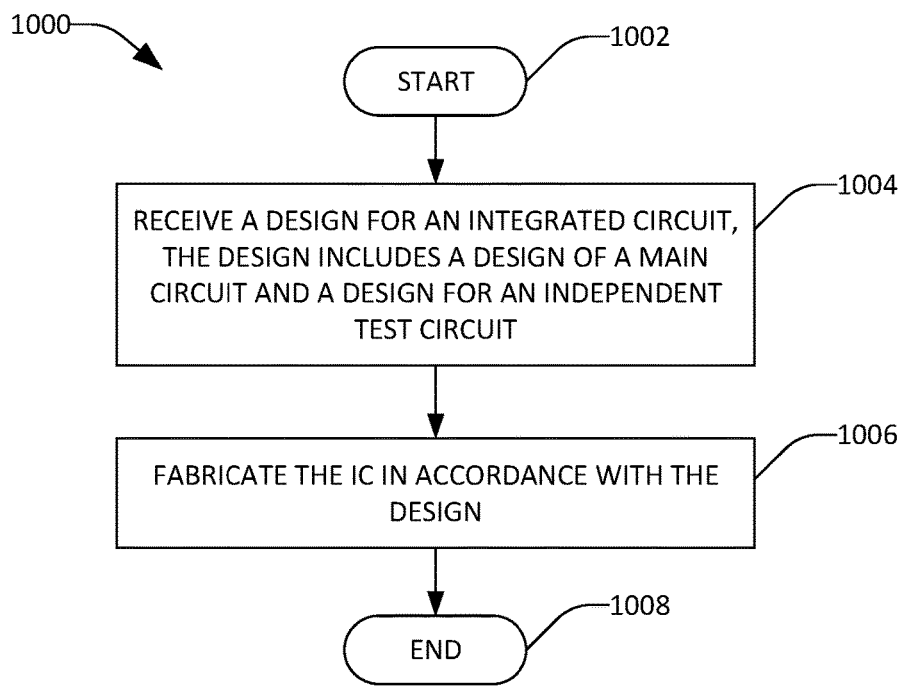
FIG. 10 is a flow diagram illustrating an exemplary methodology for fabricating an IC that comprises a test circuit.
Figure 11:
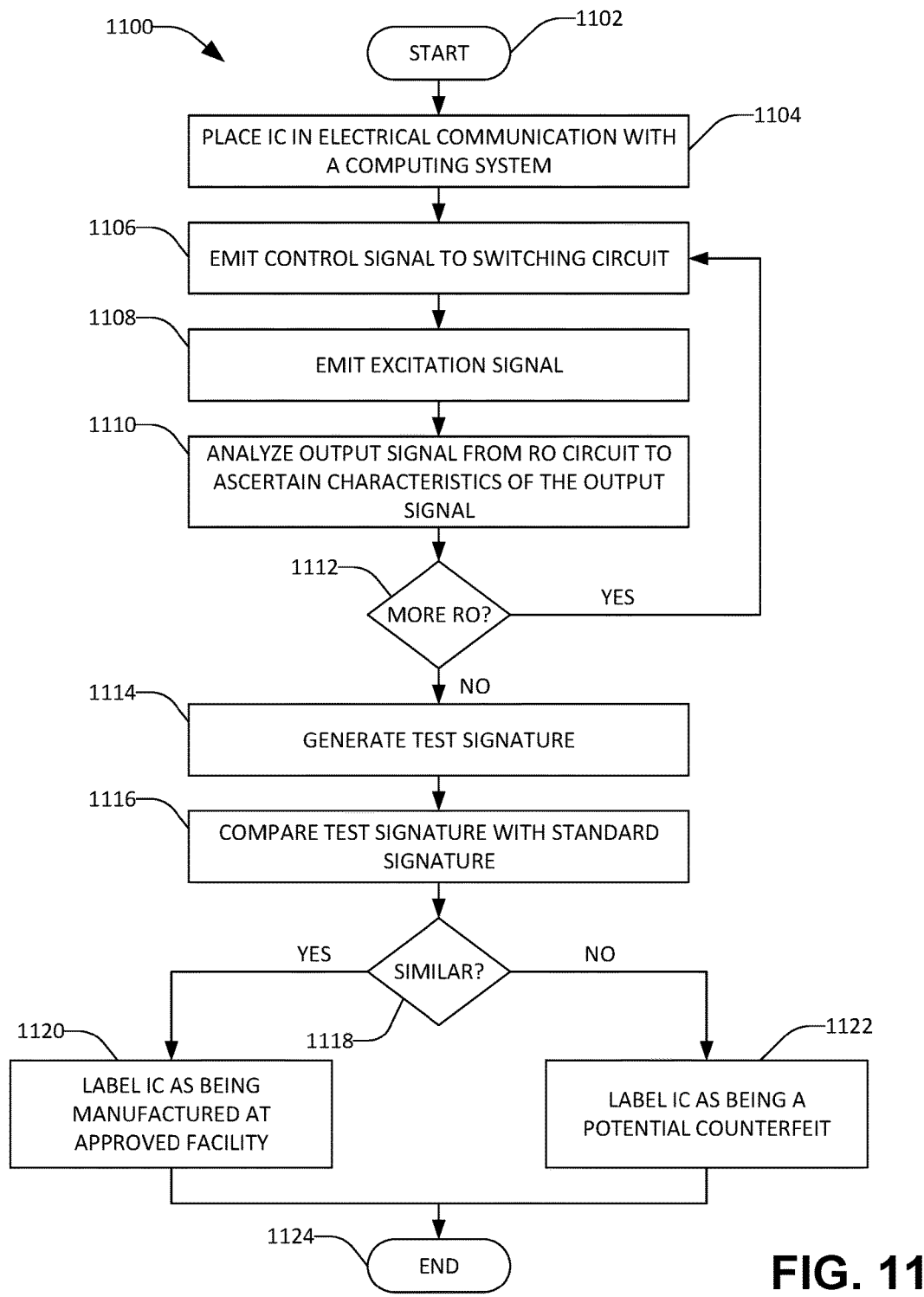
FIG. 11 is a flow diagram illustrating an exemplary methodology for determining whether an IC has been fabricated at an approved semiconductor fabrication facility.

FIGS. 10 and 11 illustrate exemplary methodologies relating to determination of whether an IC has been manufactured at an approved semiconductor fabrication facility. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 10 illustrates a methodology 1000 for fabricating an IC. The methodology 1000 starts at 1002, and at 1004 a design for the IC is received. The design for the IC includes a design of a main circuit and a design for an independent test circuit, which is to be integrated with the main circuit in the IC. At 1006, the IC is fabricated in accordance with the design, such that the IC includes both the main circuit and the test circuit. As described above, the test circuit can include several RO circuits and a switching circuit, where each of the RO circuits are accessible by way of the switching circuit. Therefore, the IC has hardware integrated therein that is usable to ensure that the IC was manufactured at an approved semiconductor fabrication facility (e.g., the IC is not counterfeit). The methodology 1000 completes at 1008.

Now referring to FIG. 11, an exemplary methodology 1100 that facilitates determining whether an IC was manufactured at an approved semiconductor fabrication facility is illustrated. The methodology 1100 starts at 1102, and at 1104 the IC is placed in electrical communication with a computing system, such that the computing system can provide electrical energy to a test circuit integrated in the IC. As noted above, the test circuit comprises a plurality of RO circuits, and the computing system can be placed in electrical communication with the RO circuits by way of a switching circuit.

At 1106, the computing system emits a control signal to the switching circuit, causing the switching circuit to place the computing system in electrical communication with a desired RO circuit (or combination of RO circuits) in the test circuit. At 1108, the computing system emits an excitation signal (e.g., having a suitable shape, frequency, and magnitude), such that the RO circuit is energized, thereby causing the RO circuit to emit an output signal. At 1110, the output signal is analyzed to ascertain characteristics of the output signal. In an example, a frequency or frequencies of the output signal over time can be determined through utilization of a clock, and the frequency or frequencies can be retained in computer-readable memory of the computing system as a signature for the RO circuit.

At 1112, a determination is made as to whether there are additional RO circuits in the test circuit that are to be energized and analyzed. If it is determined that there are additional RO circuits in the test circuit to be energized, then the methodology 1100 returns to 1106, where the computing system emits a control signal to the switching circuit to place the computing system in electrical communication with a desired RO circuit. If it is determined that there are no additional RO circuits in the test circuit to be analyzed, then at 1114 a test signature for the test circuit is generated based upon the frequencies determined for the RO circuits. For example, the test signature can be the frequencies, statistical data about the frequencies (e.g., mean frequency, average frequency, distribution of frequencies, . . . ), or the like.

At 1116, the test signature is compared with a standard signature, where the standard signature is based upon output signals from RO circuits in several test circuits of one or more standard ICs known to have been manufactured at the approved semiconductor fabrication facility. At 1118, a determination is made regarding whether the test signature is sufficiently similar to the standard signature. For example, the standard signature can include upper and lower frequency thresholds for each RO circuit in the threshold circuit, and the determination regarding whether the test signature is sufficiently similar to the standard signature can be based upon frequency values represented in the test signature lying between respective upper and lower frequency thresholds in the standard signature. In another example, the determination can be made based upon a probabilistic analysis, where a probability can be computed regarding whether the IC was manufactured at the same semiconductor fabrication facility as the facility corresponding to the standard signature. The probability can be computed by an algorithm that has been trained based upon machine learning technology (e.g., through use of labeled training data). When the probability is above a predefined threshold (e.g., 90%), then it can be determined that the test signature is sufficiently similar to the standard signature, while when the probability is at or below the predefined threshold, then it can be determined that the test signature is dissimilar to the standard signature. In still yet another example, a distance measure can be computed between the test signature and the standards signature, and the determination can be made based upon the computed distance between the test signature and the standard signature. Other techniques are also contemplated.

If it is determined that the test signature is sufficiently similar to the standard signature, then at 1120 the IC is labeled as being manufactured at the approved semiconductor fabrication facility (e.g., the IC is not a counterfeit). Thereafter, if desired, the standard signature can be updated based upon the test signature, since the test signature has been found to be representative of the approved semiconductor manufacturing facility. If it is determined that the test signature is dissimilar to the standard signature, then at 1122 the IC is labeled as potentially being manufactured at a semiconductor fabrication facility that is other than the approved semiconductor fabrication facility, and further analysis can be undertaken with respect to the IC.

The methodology 1100 can be repeated for each IC that is desirably tested. Further, the methodology 1100 can be extended to include standard signatures for several semiconductor fabrication facilities. Thus, for instance, the methodology 1100 can be extended to allow for unique identification of which semiconductor fabrication facility fabricated the IC. The methodology 1100 completes at 1124.

Figure 12:
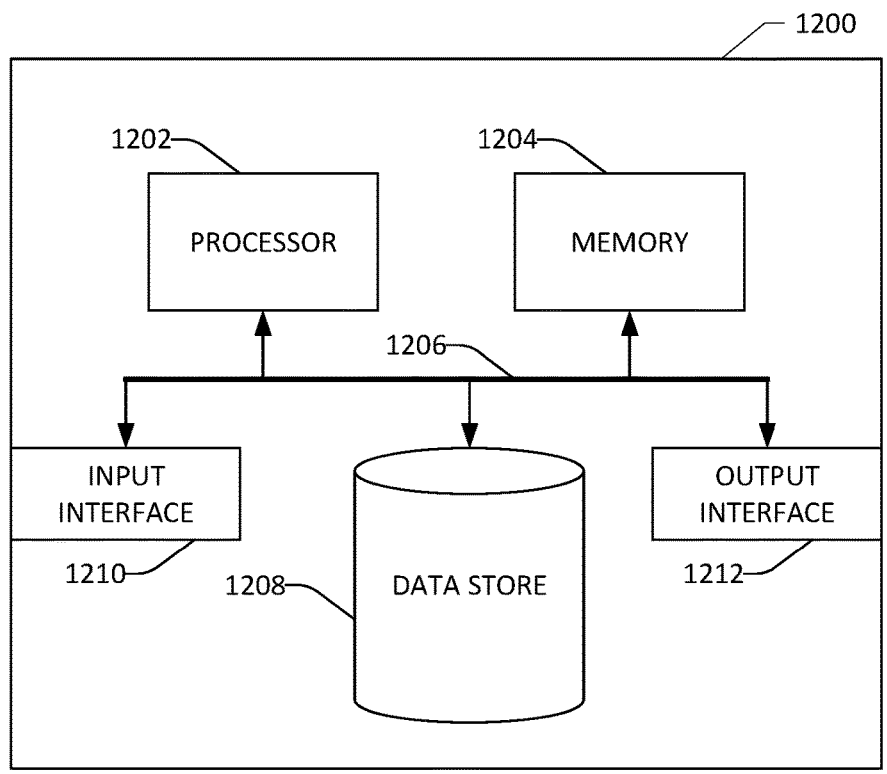
FIG. 12 illustrates an exemplary computing device.

Referring now to FIG. 12, a high-level illustration of an exemplary computing device 1200 that can be used in accordance with the systems and methodology disclosed herein is illustrated. For example, the computing device 1200 may be utilized to enable determination of whether an IC has been manufactured at an approved semiconductor fabrication facility. For example, the computing device 1200 can operate as the computing system 206 and/or a portion thereof. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store signatures, time-series signals, etc.

The computing device 1200 additionally includes a data store 1208 that is accessible by the processor 1202 by way of the system bus 1206. The data store 1208 may include executable instructions, test signatures, standard signatures, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc., by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method comprising:
   comparing a test signature with a standard signature, the test signature based upon an output signal from a test circuit integrated in an integrated circuit (IC) that is to be tested, the test circuit comprising a plurality of ring oscillator (RO) circuits, wherein the output signal is based upon signals emitted by each of the RO circuits, and further wherein each RO circuit in the plurality of RO circuits being non-identical to each other RO circuit in the plurality of RO circuits, the plurality of RO circuits comprising a first RO circuit, the first RO circuit comprises a first trace of a first width and a second RO circuit, the second RO circuit comprising a second trace of a second width, the first width being greater than the second width, the IC further comprises a main circuit that is independent of the test circuit, the standard signature based upon a second output signal of the test circuit integrated into a standard IC that is known to have been manufactured at an approved semiconductor fabrication facility, the standard IC additionally comprises the main circuit; and based upon the comparing of the test signature with the standard signature, assigning a label to the IC that is indicative of whether the IC was manufactured at the approved semiconductor fabrication facility.

2. The method of claim 1, the label indicating that the IC was not manufactured at the approved semiconductor fabrication facility.

3. The method of claim 1, the label indicating that the IC was manufactured at the approved semiconductor fabrication facility.

4. The method of claim 1, further comprising:
energizing the RO circuit of the test circuit of the IC to cause the RO circuit to generate at least a portion of the output signal; and
generating the test signature based upon at least the portion of the output signal from the RO circuit.

5. The method of claim 4, wherein the test circuit comprises:
a switching circuit that is configured to electrically couple a computing system with any RO circuit in the plurality of RO circuits, the method further comprising:
transmitting a control signal to the switching circuit to cause the computing system to be electrically coupled to the RO circuit from amongst the plurality of RO circuits; and
energizing the RO circuit responsive to transmitting the control signal.

6. The method of claim 5, further comprising:
transmitting a second control signal to the switching circuit to cause the computing system to be electrically coupled to a second RO circuit from amongst the plurality of RO circuits;
energizing the second RO circuit responsive to transmitting the second control signal such that the second RO circuit emits a third output signal; and
generating the test signature based upon the third output signal from the second RO circuit.

7. The method of claim 6, wherein the RO circuit comprises a first metallic trace that has a first width, and the second RO circuit comprises a second metallic trace that has a second width that is larger than the first width.

8. The method of claim 7, wherein the first metallic trace is formed of a first composition, and wherein the second metallic trace is formed of a second composition that is different from the first composition.

9. The method of claim 4, further generating the test signature based upon the output signal from the RO circuit comprises:
computing at least one frequency of the output signal; and
generating the test signature to include the at least one frequency.

10. The method of claim 9, wherein comparing the test signature with the standard signature comprises comparing the at least one frequency in the test signature with at least one corresponding frequency in the standard signature.

* * * * *